United States Patent [19]

Patton et al.

[11] Patent Number: 5,089,335

[45] Date of Patent: Feb. 18, 1992

[54] CROSSLINKING PRIMER FOR FLEXIBLE PACKAGING FILM

[75] Inventors: Lewis E. Patton, Charlotte, N.C.; Dennis E. McGee, LaVerne, Calif.

[73] Assignee: Union Oil Company of California, Los Angeles, Calif.

[21] Appl. No.: 436,377

[22] Filed: Nov. 14, 1989

[51] Int. Cl.$^5$ .................. B32B 7/12; B32B 27/08
[52] U.S. Cl. ............................ 428/341; 428/35.4; 428/35.6; 428/483; 428/518; 428/520; 428/910
[58] Field of Search ............... 428/518, 35.4, 35.6, 428/483, 520, 341, 910

[56] References Cited

U.S. PATENT DOCUMENTS

| | | | |
|---|---|---|---|
| 2,600,831 | 6/1952 | Baldsiefen | 430/510 |
| 3,023,126 | 2/1962 | Underwood et al. | 428/423.5 |
| 4,214,039 | 7/1980 | Steiner et al. | 428/414 |
| 4,374,894 | 2/1983 | Antlfinger | 428/288 |
| 4,686,260 | 8/1987 | Lindemann et al. | 524/458 |
| 4,794,136 | 12/1988 | Touhsaent | 524/512 |
| 4,810,751 | 3/1989 | Jellinek et al. | 524/811 |

*Primary Examiner*—Merrell C. Cashion, Jr.
*Assistant Examiner*—D. S. Nakarani
*Attorney, Agent, or Firm*—Gregory F. Wirzbicki; Michael A. Kondzella; William M. Dooley

[57] ABSTRACT

A multi-ply film including a thermoplastic polymeric substrate, and a vinylidene chloride polymer top-coat have a primer which anchors the substrate to the topcoat. The primer is a copolymer of one or more acrylic comonomers and a cross-linking copolymerizable comonomer having pendant free hydroxyl groups or groups convertible to free hydroxyl groups.

24 Claims, No Drawings

CROSSLINKING PRIMER FOR FLEXIBLE PACKAGING FILM

This invention relates to flexible packaging materials. In one of its more particular aspects it relates to primers for improving the anchoring of films to substrates.

BACKGROUND OF THE INVENTION

Flexible films of various types are used in packaging. In the packaging of foods, in particular, such films require strength as well as the properties necessary to protect packaged foods from the adverse environmental effects of moisture and oxygen. Since no single film material was known to possess all the properties desired for a given packaging application, it was found desirable to provide multi-layer or multi-ply combinations of materials each of which possessed one or more of the desired properties. For example, polyvinylidene chloride films, which provide desired moisture and oxygen impermeability and heat sealability, can be anchored to polypropylene films which possess desired strength characteristics.

Although polyvinylidene chloride barrier films can be adhered to various thermoplastic polymeric substrates such as polypropylene films, it has been observed that the adhesion displayed between such films is not always adequate. It has therefore been proposed to use a primer in the form of a polymeric layer between the polyvinylidene chloride barrier, which functions as a top-coat, and the thermoplastic polymeric substrate to improve the adhesion between top-coat and substrate.

Solvent-based primers such as solutions of polyurethane resins dissolved in organic solvents were originally used for this purpose, as described in U.S. Pat. No. 3,023,126. While such materials were satisfactory for improving the anchoring of a polyvinylidene chloride top-coat to polypropylene substrates, existing environmental considerations now limit the use of organic solvents in packaging materials, particularly in materials for the packaging of food products.

Water-based epoxy primers, described in U.S. Pat. No. 4,214,039, do not adversely affect the environment. However, since the use of epoxy primers requires the mixing of two components immediately prior to use and since epoxy primers have a pot life of at most a few days, such primers are too cumbersome to achieve wide application.

A primer comprising an acrylic emulsion cross-linked with a water soluble melamine resin, as described in U.S. Pat. No. 4,794,136, has been found to have desirable properties. However, the need to include a separate crosslinking resin in the primer formulation is disadvantageous.

It would be desirable, therefore, to provide a flexible packaging film for use in packaging a wide variety of products, especially food products, which would utilize a self-crosslinking primer in the form of a single component, water-based system.

SUMMARY OF THE INVENTION

In accordance with the present invention, a self-crosslinking acrylic copolymer is utilized as a primer with a flexible polymeric substrate and a polyvinylidene chloride top-coat. The resulting multi-ply flexible film possesses the properties of strength, moisture and oxygen impermeability, and heat sealability desired for packaging food products and other products sensitive to the environment.

The primer comprises the product of copolymerization of a mixture comprising one or more acrylic comonomers and a crosslinking comonomer having a free hydroxyl group or a group convertible to a free hydroxyl group. More specifically, the primer comprises the product of copolymerization of a mixture comprising a) one or more acrylic comonomers of the formula

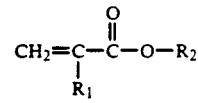

wherein $R_1$ is H or an aliphatic radical having 1 to 6 carbon atoms, and $R_2$ is an aliphatic radical containing 1 to 20 carbon atoms, and b) a comonomer having the formula

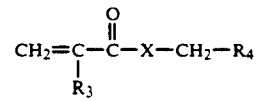

wherein $R_3$ is H or an aliphatic radical containing 1 to 6 carbon atoms, X is N or O and $R_4$ is OH or

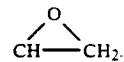

The latter comonomer contributes to the resulting copolymer the capability of being cross-linked upon being dried or over-coated with a low-pH latex such as a polyvinylidene chloride latex.

DESCRIPTION OF THE PREFERRED EMBODIMENTS

The primer of the present invention is effective in improving the adhesion of a moisture and oxygen barrier film to a thermoplastic film substrate. Use of the primer thereby makes possible the use of a wider variety of barrier films and substrates by eliminating the need for the barrier film itself to possess adhesive properties for anchoring to the substrate. Thus the trade-off between the level of adhesion to the film substrate and the level of oxygen and moisture impermeability and heat sealability of the barrier film which had to be considered where no primer was utilized is no longer a problem. With the primer providing the necessary adhesive properties, the desired level of oxygen and moisture impermeability and heat sealability can be readily provided by choosing a barrier film having the desired properties. Furthermore, the film substrate can be selected to provide the needed strength for the packaging film in which it is incorporated without consideration of its ability to adhere to the barrier film.

The primer utilized in the present invention is the product of copolymerization of a mixture of a) one or more acrylic comonomers of the formula

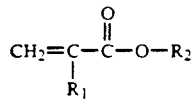

wherein $R_1$ is H or an aliphatic radical having 1 to 6 carbon atoms, and $R_2$ is an aliphatic radical containing 1 to 20 carbon atoms, and b) a comonomer having the formula

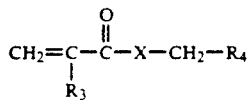

wherein $R_3$ is H or an aliphatic radical containing 1 to 6 carbon atoms, X is N or O and $R_4$ is OH or

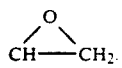

In addition to C and H, $R_1$, $R_2$ and $R_3$ can contain one or more halogen, nitro, amino or similar substituents.

Preferably the first comonomer is an acrylate or methacrylate, that is, $R_1$ is H or $CH_3$. More preferably, the first comonomer is a $C_1$ to $C_4$ alkyl acrylate or methacrylate. Most preferably the first comonomer is selected from ethyl acrylate, butyl acrylate, methyl methacrylate and mixtures thereof.

The second comonomer, which is a crosslinking comonomer, is preferably an N-hydroxymethyl amide or a glycidyl ester. More preferably it is N-methylolacrylamide or glycidyl methacrylate.

The crosslinking comonomer is typically present in a proportion of about 1 part to about 15 parts per one hundred parts total monomer (phm). Preferably it is present in a proportion of about 2 phm to about 10 phm and more preferably about 2 phm to about 4 phm. The first comonomer is typically present in a proportion of about 85 phm to 99 phm, preferably 90 phm to 98 phm and more preferably about 96 phm to 98 phm. Additional comonomers preferably alkenyl aromatics, vinyl esters of carboxylic acids, monoolefins, olefinically unsaturated nitriles and conjugated diolefins can also be present in a proportion of about 1 phm to 10 phm.

Copolymers of the above described comonomers can be prepared by free-radical initiated emulsion polymerization methods, using either thermal or redox techniques. Further, the reaction may be conducted by batch, semi-batch or continuous procedures, similar to well known methods in conventional polymerization reactions. Free-radical polymerization involves emulsifying the ingredients in water by gradually adding the monomers to be polymerized and a suitable surfactant or surfactants simultaneously to an aqueous reaction medium with agitation at rates proportionate to the respective percentage of each monomer in the finished copolymer and initiating and continuing the polymerization with a suitable polymerization catalyst. Optionally, one or more of the comonomers and surfactant(s) can be added disproportionately throughout the polymerization so that the polymer formed during the initial stages of polymerization will have a composition and/or a molecular weight differing from that formed during the intermediate and later stages of the same polymerization reaction.

The purpose of the surfactant is to initiate particle formation and to provide physical stability of the dispersion. Illustrative of anionic surfactants are alkali metal or ammonium salts of alkyl, aryl, or alkylaryl sulfonates, sulfates, phosphates, phosphonates, etc. Examples include sodium lauryl sulfate, sodium octylphenol glycol ether sulfate, sodium dodecylbenzene sulfonate, sodium lauryl diglycol sulfate, ammonium tritertiarybutylphenol penta- and octa-glycol sulfates, dioctyl sodium sulfosuccinate, alpha-olefin sulfonates and sulfonated biphenyl ethers. Numerous other examples of suitable surfactants are disclosed, for example, in U.S. Pat. No. 2,600,831, the disclosure of which is incorporated herein by reference in its entirety. Nonionic surfactants, which are preferred, are exemplified by octylphenoxy polyethoxy ethanol, and nonylphenoxy poly(ethyleneoxy) ethanol.

Illustrative water soluble, free-radical initiators or polymerization catalysts are hydrogen peroxide, sodium persulfate, potassium persulfate and ammonium persulfate, and combinations of the above with a reducing agent activator, such as a sulfite, more specifically an alkali metabisulfite, hyposulfite or hydrosulfite, glucose, ascorbic acid, erythorbic acid, etc. to form a "redox" system. Normally the amount of initiator used ranges from about 0.1 percent to about 5 percent, by weight, based on the monomer charge. In a redox system, a corresponding range (about 0.1 to about 5 percent) of reducing agent is also normally used.

The reaction, once started, is continued, with agitation, at a temperature sufficient to maintain an adequate reaction rate until most, or all, of the comonomers are consumed and until the reaction medium reaches a polymer solids concentration between about 1 percent and about 50 percent, by weight. Normally, the solids content is kept above 10 percent to minimize prying problems when the copolymer is applied to substrates.

At this point, the reaction product will typically comprise an aqueous dispersion of discrete particles of an emulsion copolymer.

The dispersed particles will have a size range of about 100 nm to about 2100 nm as measured by a Coulter Model N-4 Submicron Particle Size Analyzer. The dispersion, which is milky white in appearance, normally will have a Brookfield viscosity in the range of about 5 cps to about 500 cps.

In the present invention, reaction temperatures in the range of about 10° C. to about 100° C. will yield satisfactory polymeric compositions. When persulfate systems are used, the temperature of the dispersion is normally in the range of about 60° C. to about 100° C., while, in redox systems, the temperature is normally in the range of about 10° C. to about 70° C., and preferably about 30° C. to about 60° C.

The resulting copolymer emulsion is typically applied as primer, by means of a Meyer rod, air knife, gravure or similar method to a thermoplastic polymeric substrate such as a polyolefin or polyester film in a coating weight of about 0.1-2.5 lb./ream, preferably about 0.2-1.0 lb./ream.

Corona treated films such as nylon polyethylene, oriented polypropylene (OPP), ethylene vinyl acetate copolymers and polyethylene terephthalate have been found to be particularly desirable substrates.

The primed substrate is then overcoated in a similar manner with a polyvinylidene chloride latex. Any vinylidene chloride polymer can be used depending upon the particular properties desired. Homopolymers of vinylidene chloride can be used as well as copolymers with various copolymerizable comonomers, preferably acrylates, methacrylates and unsaturated carboxylic acids.

The overcoated primed substrate is then dried to provide a multi-ply film having the desired properties of strength and moisture and oxygen impermeability.

The invention will be better understood by reference to the following examples which are intended to illustrate the invention without limiting the scope thereof, which is defined in the appended claims. All percentages are by weight unless otherwise specified.

The following example illustrates the preparation of a typical primer according to the present invention.

EXAMPLE 1

A mixture containing 22.4 g. ethyl acrylate, 19.9 g. methyl methacrylate, 2.3 g. N-methylolacrylamide and 3.7 g. IGEPAL CO-897, a nonylphenoxy poly(ethyleneoxy) ethanol surfactant available from GAF Chemicals Corp., Wayne, N.J., was emulsified in 51.4 cc. of deionized water and heated to a temperature of 95° F. A solution of initiator containing 0.15 g. potassium persulfate, 0.15 g. sodium bisulfite and 0.0005 g. ferrous sulfate dissolved in 15 cc. of deionized water was added. The polymerization temperature was maintained at 133°–137° F. for 9 hours, cooled and filtered. The pH value of the emulsion was 2.7. Total solids were 46 percent and the viscosity was 35 cps. The copolymer had a $T_g$ value of +26° C.

The following example illustrates the preparation of another primer according to the present invention.

EXAMPLE 2

A mixture containing 21.1 g. butyl acrylate, 21.1 g. ethyl acrylate 1.99 g. N-methylolacrylamide, 2.49 g. IGEPAL CO-897 and 0.87 g. TRITON X-100, an octylphenoxy polyethoxy ethanol surfactant available from Rohm and Haas Co., Philadelphia, Pa., was emulsified in 52.2 g. deionized water and heated to a temperature of 95° F. A solution of initiator containing 0.13 g. potassium persulfate and 0.11 g. sodium bisulfite dissolved in 15 cc. of deionized water was added. The polymerization temperature was maintained at 133°–137° F. for 9 hours, cooled and filtered. The pH value of the emulsion was 2.7. Total solids were 46 percent and the viscosity was 300 cps. The copolymer had a $T_g$ value of −33° C.

The following example illustrates the seal strengths realized using the primer of the present invention.

EXAMPLE 3

The primer of Example 1 was applied to an oriented polypropylene film (OPP) at a coating weight of 2.5 lb./ream using a wire-wound Meyer rod. To the primed OPP was then applied as a top-coat an emulsion containing a copolymer of vinylidene chloride (85%) methacrylic acid (3%), methyl acrylate (0.3%), methyl methacrylate (12%), and 4 phm carnauba wax emulsion at a coating weight of 2.5 lb./ream.

The resulting top-coated primed OPP was then heat sealed by means of crimp bonding at 40 psi with a 1 sec. dwell.

The crimp seal strength determined using a 90° peel test at 2 in/min. was found to be 410 g./in. Hot tack was determined following sealing at 225° F. with 0.5 sec. dwell at various temperatures around 0.007 in. thick spring steel stock bent into a loop with the ends approximately ⅛ in. apart. Hot tack was determined to be 176 g. at 250° F., 176 g. at 260° F., 160 g. at 270° F. and 130 g. at 280° F.

A comparison of the results obtained using a primer according to the present invention (Ex. 3) with the results using other primers is shown in Table 1.

TABLE 1

| Primer | Crimp Seal Strength, g./in. | Hot Tack, g. | | | |
|---|---|---|---|---|---|
| | | 250° F. | 210° F. | 270° F. | 280° F. |
| Ex. 1 | 410 | 176 | 176 | 160 | 130 |
| A | 410 | 150 | 146 | 96 | 84 |
| B | 400 | 146 | 146 | 116 | 96 |
| C | 340 | 160 | 116 | 85 | 70 |
| D | 260 | 176 | 160 | 96 | 96 |

A. Copolymer of vinylidene chloride (83%), acrylic acid (1%), hydroxyethyl acrylate (7%), methyl acrylate (0.2%), methyl methacrylate (8%), and 2-sulfoethyl methacrylate (1%).

B. Copolymer of vinylidene chloride (69%), 2-ethylhexyl acrylate (20%), hydroxyethyl acrylate (10%), and 2-sulfoethyl methoacrylate (1%).

C. Copolymer of vinylidene chloride (90%), acrylic acid (0.5%), butyl acrylate (0.5%), methyl acrylate (0.6%), methyl methacrylate (8%), and 2-sulfoethyl methacrylate (0.4%).

D. Copolymer of vinylidene chloride (91%), acrylic acid (0.5%), butyl acrylate (0.5%), methyl acrylate (0.3%), methyl methacrylate (7%), and 2-sulfoethyl methacrylate (0.4%).

It can be seen from the results tabulated in Table 1 that the crimp seal strength obtained using the primer of the present invention is equal to or better than the crimp seal strengths obtained using various vinylidene chloride copolymers and that the hot tack is substantially better at all temperatures.

Epoxy primed films were found to display improved results over the primer of the present invention. However, as pointed out above, the use of an epoxy primer is undesirable because of the requirement of mixing two materials on site and because of stability problems.

This invention may be embodied in other forms without departing from the spirit or essential characteristics thereof. For example, it is recognized that, while the description of the present invention and the preferred embodiments thereof are directed toward primers and multi-ply films, which are satisfactory for use in wrapping foodstuffs, other materials than foodstuffs may need to be wrapped with films having the properties of moisture and oxygen impermeability described. In such applications other polymerizable cross-linkers than those specifically exemplified herein may be used. Consequently, the present embodiments and examples are to be considered only as being illustrative and not restrictive, with the scope of the invention being indicated by the appended claims. All embodiments which come within the scope and equivalency of the claims are, therefore, intended to be embraced therein.

We claim:

1. An article comprising
   (a) a thermoplastic polymeric substrate;
   (b) a first layer comprising a vinylidene chloride polymer; and
   (c) a second layer between said substrate and said first layer, consists essentially of the product of copolymerization of a mixture of (i) one or more acrylic comonomers of the formula

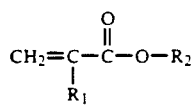

wherein $R_1$ is H or an aliphatic radical having 1 to 6 carbon atoms, and $R_2$ is an aliphatic radical containing 1 to 20 carbon atoms; and (ii) a crosslinking comonomer having the formula

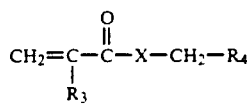

wherein $R_3$ is H or an aliphatic radical containing 1 to 6 carbon atoms, X is N or O and $R_4$ is

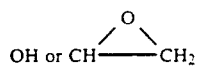

2. An article according to claim 1 wherein said substrate comprises a polyolefin or polyester film.

3. An article according to claim 1 wherein said substrate is selected from the group consisting of nylon, polyethylene, polypropylene, ethylene vinyl acetate copolymers, and polyethylene terephthalate.

4. An article according to claim 1 wherein said substrate is an oriented polypropylene film.

5. An article according to claim 1 wherein said first layer is selected from the group consisting of homopolymers of vinylidene chloride and copolymers of vinylidene chloride and polymerizable comonomers selected from the group consisting of acrylates, methacrylates and unsaturated carboxylic acids, and mixtures thereof.

6. An article according to claim 1 wherein said first layer comprises a copolymer of vinylidene chloride and at least one polymerizable comonomer selected from the group consisting of methacrylic acid, methyl acrylate and methyl methacrylate.

7. An article according to claim 1 wherein $R_1$ is H or an alkyl radical containing 1 to 6 carbon atoms.

8. An article according to claim 1 wherein $R_1$ is H or $CH_3$.

9. An article according to claim 8 wherein $R_2$ is an alkyl radical containing 1 to 8 carbon atoms.

10. An article according to claim 1 wherein said one or more acrylic comonomers is selected from the group consisting of ethyl acrylate, butyl acrylate, methyl methacrylate and mixtures thereof.

11. An article according to claim 1 wherein said crosslinking comonomer is an N-hydroxymethyl amide or a glycidyl ester.

12. An article according to claim 1 wherein said crosslinking comonomer is N-methylolacrylamide.

13. An article according to claim 1 wherein said crosslinking comonomer is glycidyl methacrylate.

14. An article according to claim 1 wherein said crosslinking comonomer is present in a proportion of about 1 phm to about 15 phm.

15. An article according to claim 1 wherein said crosslinking comonomer is present in a proportion of about 2 phm to about 10 phm.

16. An article according to claim 1 wherein said crosslinking comonomer is present in a proportion of about 2 phm to about 4 phm.

17. An article according to claim 1 wherein said second layer is present in a coating weight of about 0.1 to 2.5 lb./ream.

18. An article comprising
(a) an oriented polypropylene substrate;
(b) a top-coat for said substrate comprising a copolymer of vinylidene chloride and at least one polymerizable comonomer selected from the group consisting of methacrylic acid, methyl acrylate and methyl methacrylate; and
(c) a primer for anchoring said top-coat to said substrate, said primer comprising the product of copolymerization of a mixture of ethyl acrylate, methyl methacrylate and N-methylolacrylamide.

19. An article according to claim 18 wherein said primer is present in a coating weight of about 0.1 to about 2.5 lb./ream.

20. An article comprising
(a) a thermoplastic polymeric substrate;
(b) a first layer comprising a vinylidene chloride polymer; and
(c) a second layer, between said substrate and said first layer, consists essentially of the product of copolymerization of a mixture of (i) one or more acrylic comonomers of the formula

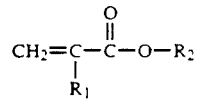

wherein $R_1$ is H or an aliphatic radical having 1 to 6 carbon atoms, and $R_2$ is an aliphatic radical containing 1 to 20 carbon atoms; and (ii) a crosslinking comonomer having the formula

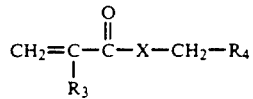

wherein $R_3$ is H or an aliphatic radical containing 1 to 6 carbon atoms, X is N or O and $R_4$ is OH or

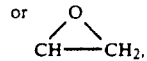

said second layer being substantially free of crosslinking resin other than said product of copolymerization of said comonomers (i) and (ii).

21. An article according to claim 20 wherein said one or more acrylic comonomers is selected from the group consisting of ethyl acrylate, butyl acrylate, methyl methacrylate and mixtures thereof.

22. An article according to claim 20 wherein said crosslinking comonomer is an N-hydroxymethyl amide or a glycidyl ester.

23. An article according to claim 20 wherein said crosslinking comonomer is N-methylolacrylamide.

24. An article according to claim 20 wherein said crosslinking comonomer is glycidyl methacrylate.

UNITED STATES PATENT AND TRADEMARK OFFICE
CERTIFICATE OF CORRECTION

PATENT NO. : 5,089,335

DATED : February 18, 1992

INVENTOR(S) : Lewis E. Patton and Dennis E. MCGee

It is certified that error appears in the above-identified patent and that said Letters Patent is hereby corrected as shown below:

Claim 1, column 6, line 67, after the word "layer" insert --,--.

Claim 20, column 8, line 50, delete the word "or".

Signed and Sealed this

First Day of June, 1993

Attest:

MICHAEL K. KIRK

*Attesting Officer*     Acting Commissioner of Patents and Trademarks